United States Patent Office 3,334,379
Patented Aug. 8, 1967

3,334,379
DEVICE FOR CLOSING AND LOCKING MOLDS OF A MACHINE FOR MANUFACTURING PLASTIC CONTAINERS
Antoine Di Settembrini, 42 Residence du Petit Val, Sucy-en-Brie, France
Filed Oct. 6, 1964, Ser. No. 401,827
Claims priority, application France, Nov. 21, 1963, 954,541, Patent 1,392,517; 1st addition, July 10, 1964, 981,455
4 Claims. (Cl. 18—5)

ABSTRACT OF THE DISCLOSURE

Machine for molding bottles of thermoplastic material by extrusion and blowing, which comprises a support rotatably movable about an axis, a plurality of molds mounted on said support, a circular cam coaxial to said axis of rotation of said support and controlling the opening and closing of said molds during the rotation of said mold support, a fixed flange extending at right angles to the axis of rotation of said support, said fixed flange being disposed behind said circular cam and a resilient abutment shoe movable in a direction at right angles to the axis of rotation of said support.

This invention relates to the manufacture of plastic containers and has specific reference to a machine designed for manufacturing plastic bottles.

This machine pertains to the known type wherein a number of molds are conveyed continuously past an extruder producing a tubular blank or parison of plastic material. Each mold is re-closed in succession on a parison section and the latter is subjected within the mold to an expansion by internal blowing so as to take the exact shape of the mold impression which corresponds to that of the desired bottle. Subsequent to this shaping step and after a sufficient cooling time the mold is opened to permit the stripping and release of the shaped bottle, and the same cycle is resumed with a fresh mold.

The present invention is concerned with improvements in a machine of the type set forth which is designed for high-speed operation and it is the essential object of this invention to provide a device for closing and locking molds in a machine of this character, this device providing an improved positive control of the movable half-mold while avoiding the rebound of these half-molds after the closing thereof.

Other features and advantages of this invention will appear as the following description proceeds with reference to the accompanying diagrammatic drawings in which.

Figure 1:
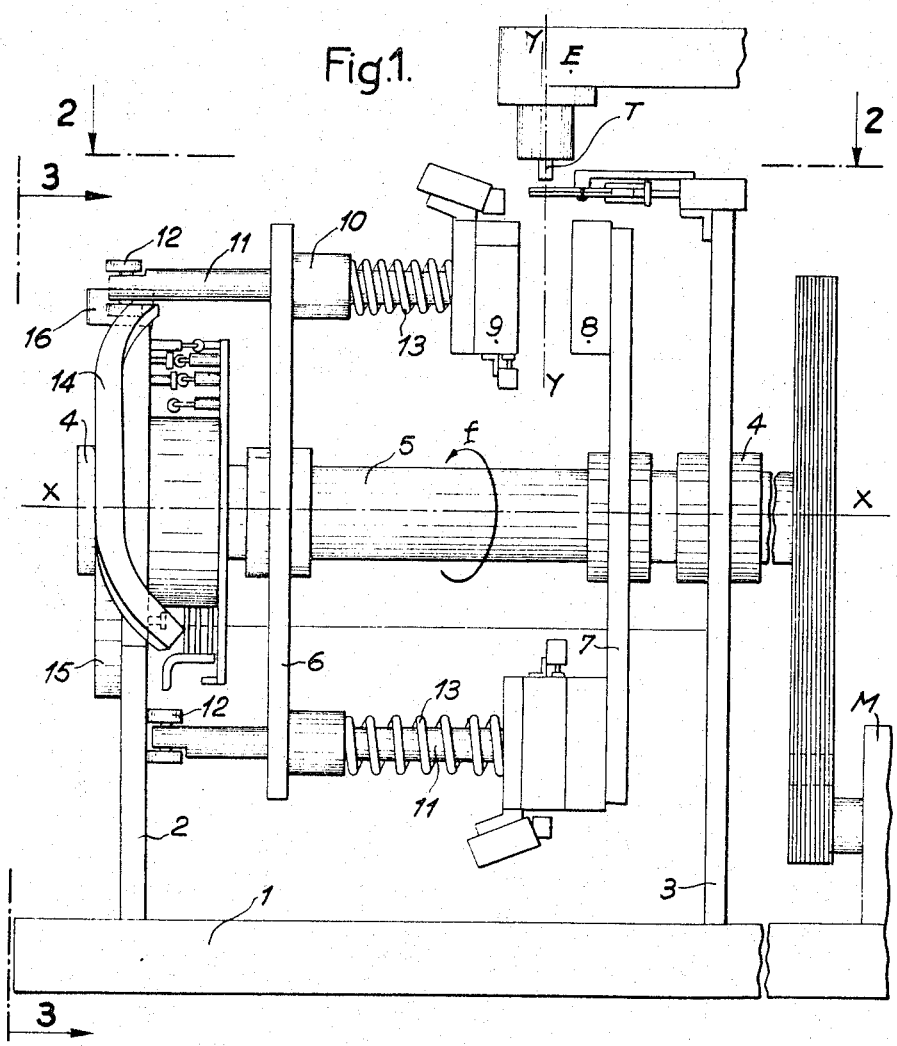
FIGURE 1 is a diagrammatic elevational view showing a typical form of embodiment of a machine constructed according to the teachings of this invention.
Figure 2:
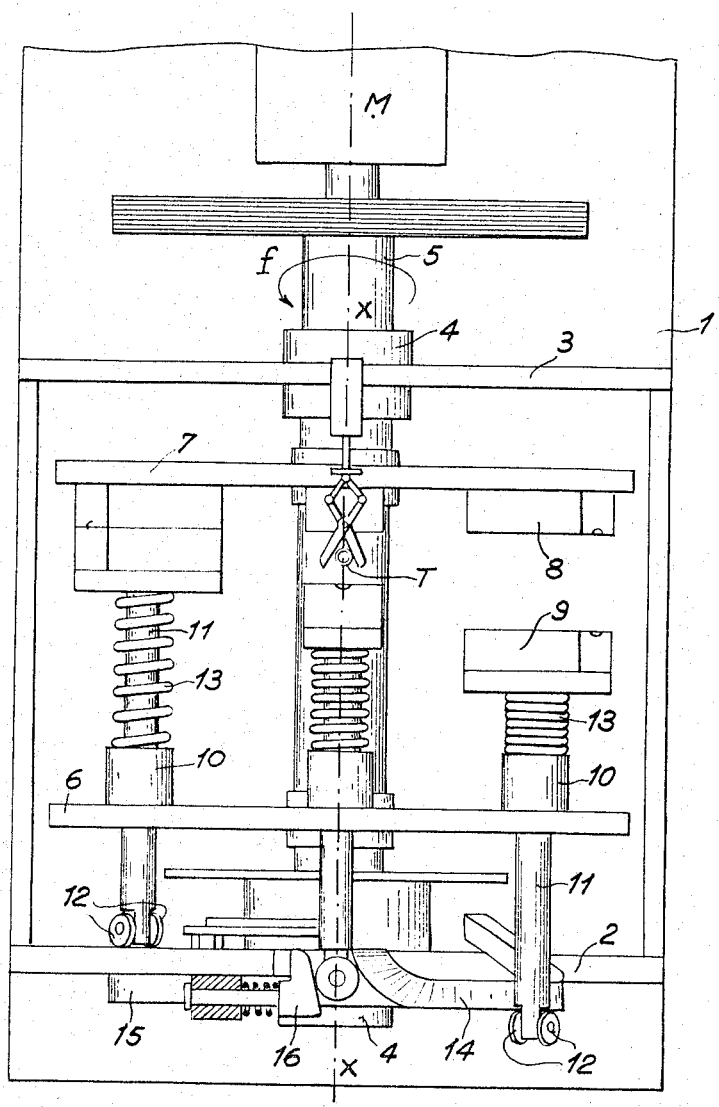
FIGURE 2 is a corresponding plan view taken in the direction of the arrows 2—2 of FIGURE 1.
Figure 3:
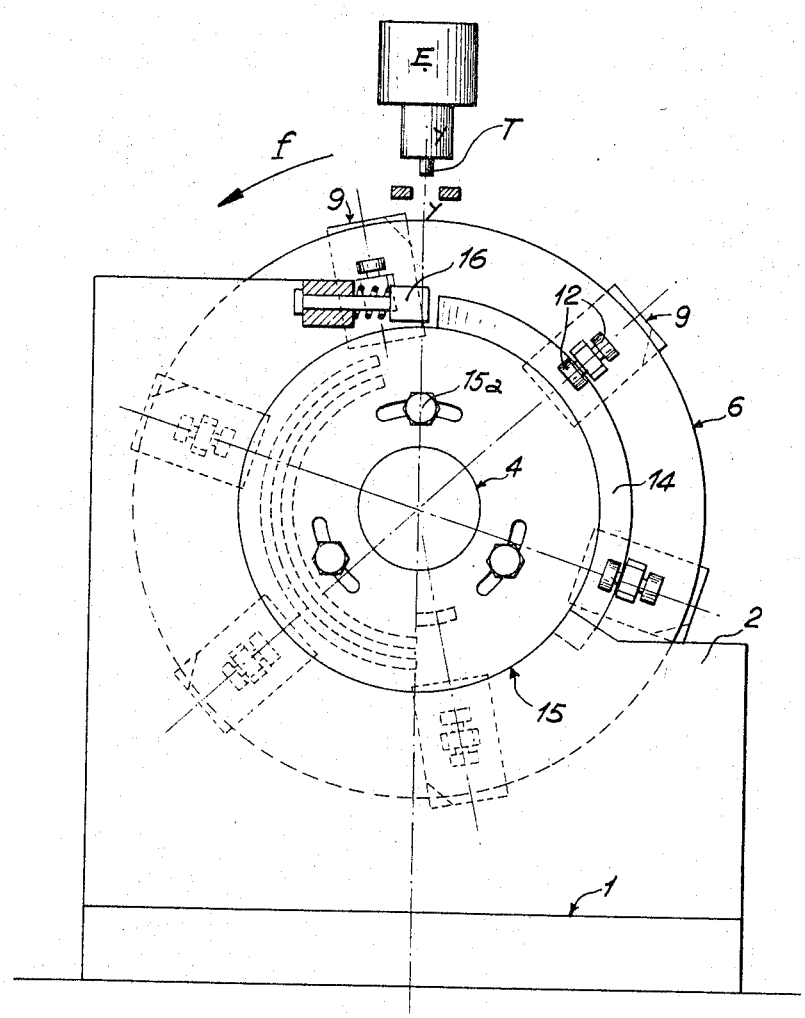
FIGURE 3 is an end view taken in the direction of the arrows 3—3 of FIGURE 1.

Referring first to the form of embodiment illustrated in FIGURES 1, 2 and 3 of the drawings, the machine according to this invention comprises a frame structure consisting essentially of a base plate or bed 1 and a pair of parallel vertical side flanges 2, 3. These flanges carry bearings 4 in which a main shaft 5 is journalled for rotation about the axle XX; this shaft 5 is driven continuously in the direction of the arrow $f$ (FIGURES 1 to 3) from a motor and variator unit M through adequate belt and pulley transmission means.

The extruder unit E shown only in very diagrammatic form in the drawing is carried by the aforesaid frame structure. The extrusion head is disposed according to a vertical axis YY intersecting the axis XX of shaft 5 and therefor extends radially thereto. This extruder E produces a tubular blank or parison T for example of rigid polyvinyl chloride.

The machine comprises furthermore a rotary mold support, the molding impressions or cavities of these molds having the shape and dimensions of the bottles to be manufactured. This support may assume substantially the shape of a rotary drum.

The rotary mold support mounted on shaft 5 consists of a pair of parallel vertical circular plates 6, 7 rigid with shaft 5 and carrying metal molds. In this example the support carries six molds, but it is clear that this number is not critical. The molds disposed at spaced annular intervals at the outer periphery of the plates consist of two portions or mold halves, that is, a fixed half-mold 8 and a movable half-mold 9, these half-molds being separated from each other by a vertical joint plane P. Plate 7 carries the fixed half-molds 8 secured thereon (on the side of the extruder E) and plate 6 carries the movable half-molds 9 but so mounted as to be movable in a direction parallel to the shaft axis XX. To this end the plate 6 carries on its outer peripheral portion as many sockets 10 as there are molds in the machine. These sockets register with the fixed half-molds 8. Each socket 10 has slidably mounted therein a rod 11 carrying at one end the corresponding movable half-mold 9 and at the opposite end a pair of rollers 12 engaging a cam face of the mold opening and closing mechanism to be described presently. Each movable half-mold 9 is resiliently urged to its closed position, that is, in engagement with the corresponding fixed half-mold, by a return coil spring 13 surrounding the rod 11 and reacting between the movable half-mold 9 and the relevant socket 10, as shown.

Figure 4:
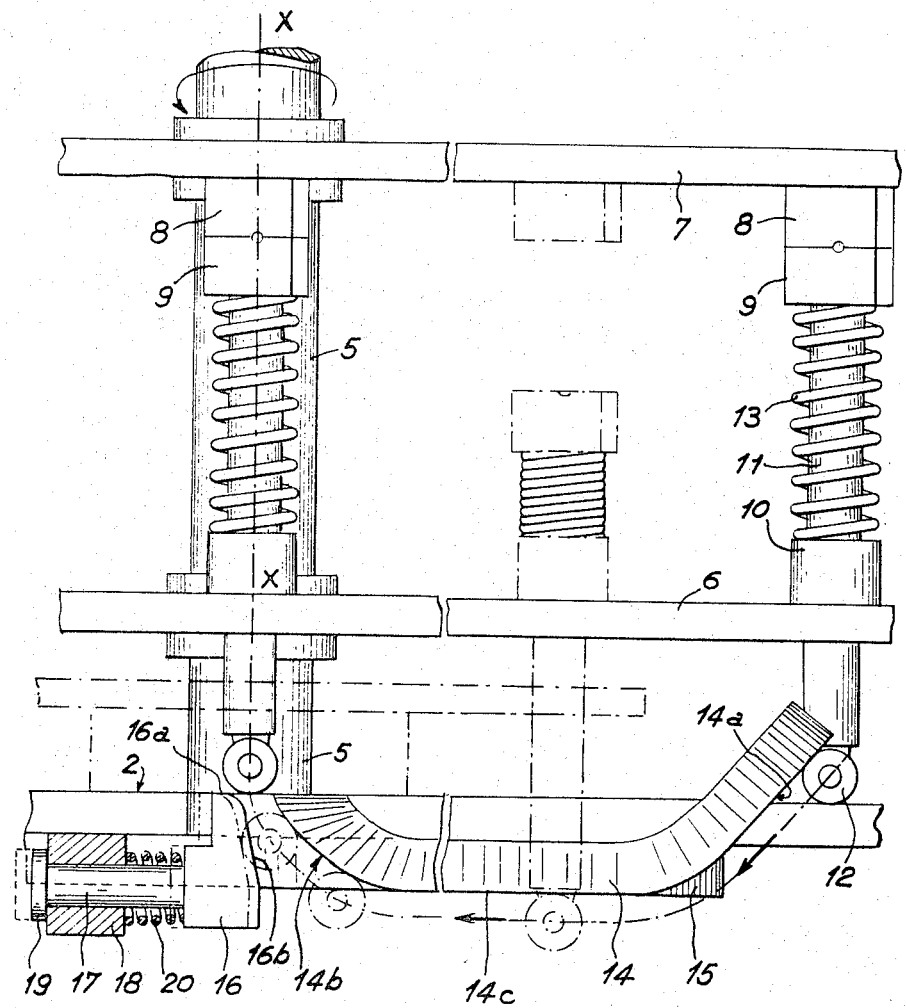
FIGURE 4 is a veiw showing in plane development the mold opening, closing and locking mechanisms.

The movement of translation parallel to the axis XX which is thus imparted to the movable mold halves 9 for opening and closing the molds is obtained by using mechanical means comprising a cam member 14 carried by an annular plate 15 concentric with the axis XX and secured by screws 15a on the lateral flange 2 of the frame structure of the machine. In FIGURE 4 the cam member 14 concentric with said shaft axis XX is illustrated in its developed form in a plane. It comprises an inclined ramp section 14a engageable by roller-type followers 12 carried by the rods 11 supporting the mold halves 9, a straight section 14c along which the rollers 12 keep the mold halves 9 in their open position, and finally another inclined ramp section 14b along which the rollers 12 gradually resume their initial or mold-closing position.

The roller followers 12 normally roll on the inner face of the machine side flange 2 in the closed mold position. The engagement cam section 14a projects somewhat in relation to this inner face. The beginning of this cam section lies about 120° from the extrusion axis YY in the upstream direction, in relation to the direction of rotation (arrow f). This engagement section terminates and merges into a straight section 14c for holding the mold in the open position, this straight section being located in a zone spaced about 90° from the extrusion axis YY, also upstream thereof, this straight runway for rollers 12 terminating in turn in the vicinity of, and at a short angular distance from, said axis YY. It subsequently merges into another but inverted inclined cam section 14b along which the rollers release the movable half-mold 9 to reclose the molds.

The rollers 12 of rods 11 carrying the mold halves 9 are urged against the initial cam section 14a as well as against the straight section 14c of cam 14 by return coil springs 13 compressed between the movable mold halves 9 and the sockets 10 of rotary plate 6. The rollers 12 are also urged against the engagement cam section 14a by the driving torque applied to the rotary drum assembly. Since this rotational drive tends to move the rollers 12 away from the release cam section 14b, a complementary device is provided for urging the rollers 12 against this release cam section 14b and permitting the closing of the molds according to a law governed by the configuration of said cam section 14b.

This complementary device consists of a shoe 16 formed with an operative face 16b approximately parallel to the contour of said release cam section 14b of the circular cam in the end portion thereof, that is, nearly parallel to the axis of rotation XX, and also with a flat operative face 16a co-planar with the inner face of the machine side flange 2. This abutment shoe is carried by a rod 17 slidably mounted in a socket 18 and formed at the opposite end with a head 19 abutting against the socket 18. A coil compression spring 20 surrounding the rod 17 is disposed between the shoe 16 and socket 18. This shoe 16 may have two end positions:

In the first end position (shown in thick lines in FIGURE 4) the expanded spring 20 urges the head 19 against the rear face of socket 18; under these conditions, the distance between the shoe 16 and the release cam section 14b is inferior to the diameter of roller 12;

In the other end position (shown in broken lines in FIGURE 4) the roller 12 engaged between said cam section 14b and the operative face 16b of shoe 16 causes the socket 18 to recede while compressing the spring 20. Thus, the roller 12 is resiliently urged by the shoe 16 against the end portion of the release cam section 14b.

During the continuous rotation of the mold-supporting drum the rollers 12 firstly engage the inner face of flange 2 (closed molds) and then ride up the engagement cam section 14a, thus opening the molds. Then, they roll along the straight cam section 14c to hold the molds open and finally engage the release cam section 14b. Thus, the molds are re-closed firstly gradually and then rapidly until the rollers 12 escape from the cam section 14b. Then the molds are fully closed. Due to the specific configuration of the end cam section 14b the molds are closed rather abruptly whereby the joint plane of the movable mold half 9 is actually clapped against the opposite joint plane of the fixed mold half 8.

As it moves out from the passage formed between the release cam section 14b and the shoe 16 of the resilient abutment device the roller 12 releases this shoe 16 which is resiliently urged back by its compression spring 20. Then the spring 13 of rod 11 causes the roller 12 to engage the front face 16a of shoe 16.

This shoe 16 is returned to its inoperative position immediately after the roller 12 has left cam 14, thus promptly locking the molds in their closed position when this position has been attained. This quick locking of shoe 16 prevents the rebound of the mold halves 9 due to the clapping thereof against the joint planes of the fixed mold halves, by reaction of these mold halves.

If this operative face 16a of shoe 16 were not provided a rebound would take place during the short time period preceding the moment in which the roller 12 having just left the cam section 14b has not resumed its bearing engagement with the inner face of flange 2. This rebound as well as the resulting gap developing between the mold halves would obviously delay the moment at which the blowing phase could commence, thus increasing inasmuch the time period elapsing between the beginning of the mold closing movement and the mold opening movement. Thus, the use of this device will reduce the process time and increase the production rate of the machine.

Just after leaving the face 16a of the locking device the rollers 12 engage the inner face of the side flange 2 of the machine, whereby the molds remain locked in their closed position.

Figure 5:
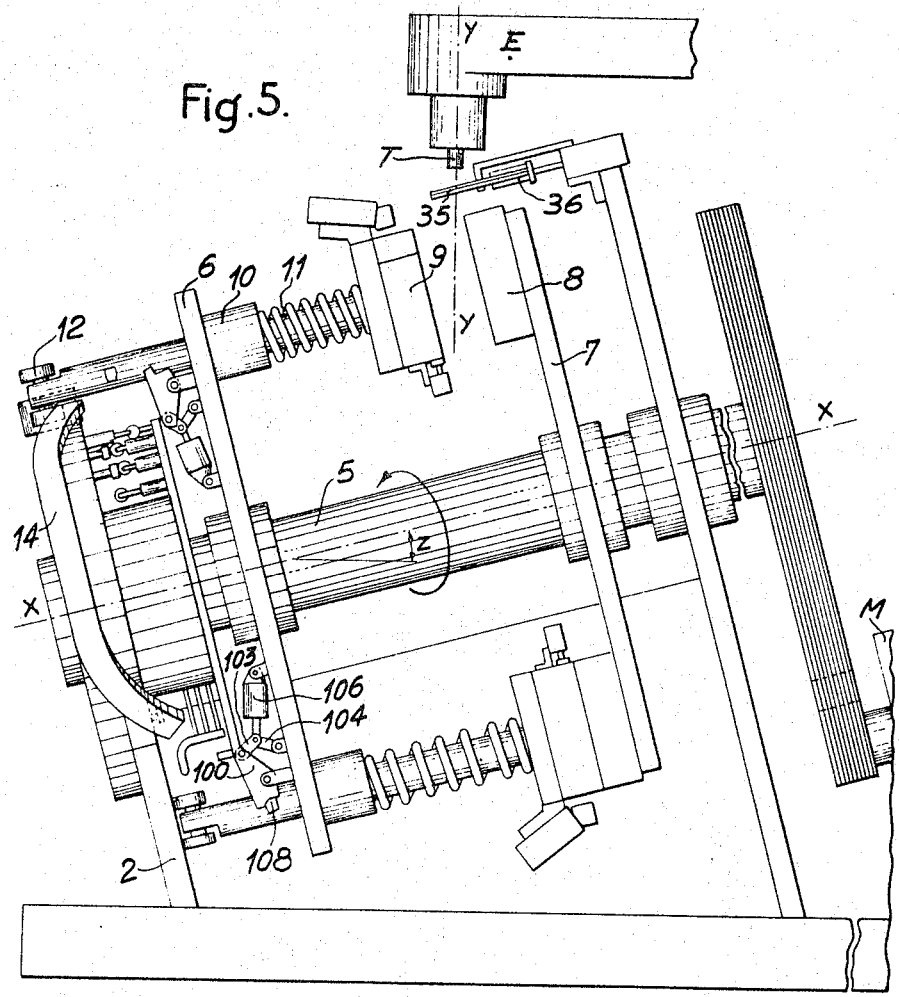
FIGURE 5 is a diagrammatic elevational view showing another form of embodiment of the machine of this invention.

Now an alternate form of embodiment of the machine will be described with reference to FIGURES 5 to 7 of the drawings, in which the same elements as those of the preceding figures are designated by the same reference numerals.

In these figures the axis XX of shaft 5 is inclined and forms an angle z to the horizontal. Therefore, the joint plane P of the half-molds forms with the axis YY of the extruder the same angle as this angle z, whereby the upper portion of the fixed half-mold 8, that is, the one nearest to the extruder E, be nearer to the axis YY than the lower portion of this half-mold.

Figure 6:
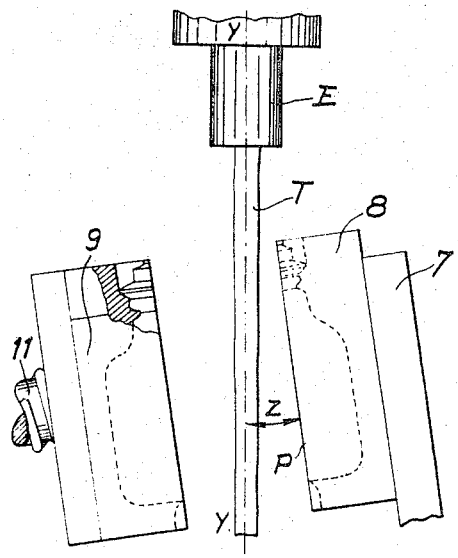
FIGURE 6 is a diagrammatic view showing an open mold registering with the extruder.
Figure 7:
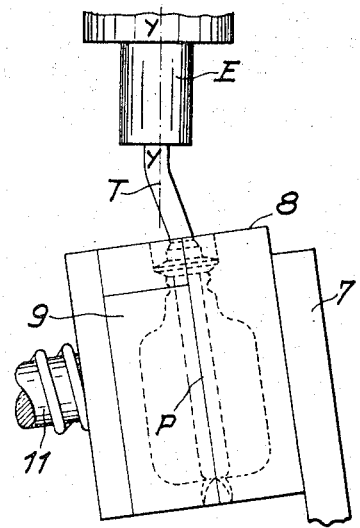
FIGURE 7 is a view similar to FIGURE 6 but with the mold closed.

In FIGURE 6, a mold is shown in its open position. When a sufficient tubular parison section T has been extruded to correspond to the mold height the mold is reclosed (see FIGURE 7) by moving the movable half-mold 9 towards the fixed half-mold 8 and a shearing device 35, 36 (FIGURE 5) cuts off the tubular parison T as the mold is re-closed.

This alternate arrangement is advantageous in that the lower portion of the tubular blank is relatively remote from each half-mold. This is particularly advantageous when the extruded material is charged with statical electricity, for the risk of being attracted by the fixed half-mold and of adhering thereto, thus interfering with the natural downward movement of the parison, is definitely precluded.

The same applies if, during the downward movement, the tubular parison tends to assume a curved configuration.

In this form of embodiment of the machine, means are provided for holding each half-mold in its locked position during the closing thereof, notably during the blowing step. As the locking means associated with the various molds are all the same, only the locking means of a single mold will be described hereinafter with reference to FIGURES 5, 8, 9 and 10. These means comprise a rocker 100 formed with a heel 101 which is fulcrumed on a pin 102 carried by the plate 6. The pivotal movements of this rocker 100 are obtained by means of a set of links 103, 104 having one end pivoted on a common rod 105 of a single-acting cylinder 106 incorporating a return spring 107. The other end of link 104 is pivoted on said plate 6 and the other end of link 103 is pivoted on the end of said rocker 100. The heel 101 of rocker 100 is adapted to engage and retain a projection 108 carried by the rod 11 when the mold is closed. The arrangement comprises as many locking devices as there are molds in the machine, and therefore as many rods 11 disposed at spaced angular intervals around the plate 6.

Figure 8:
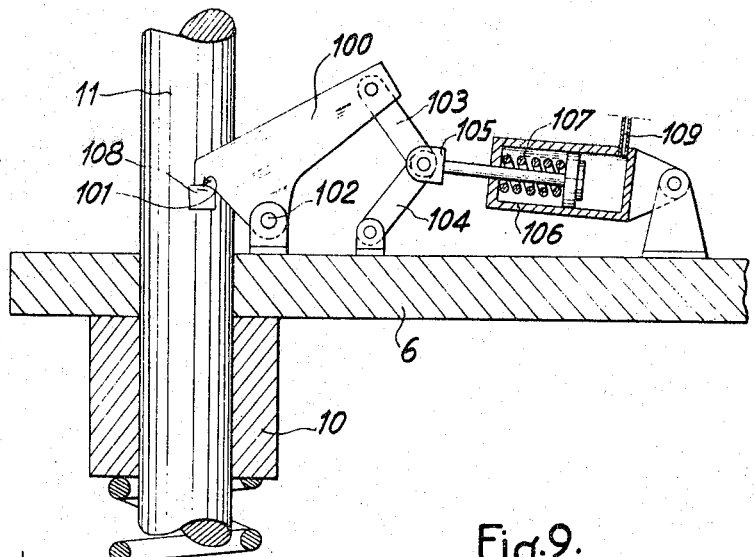
FIGURE 8 is a detail view showing on a larger scale the locking device in its locking position.
Figure 9:
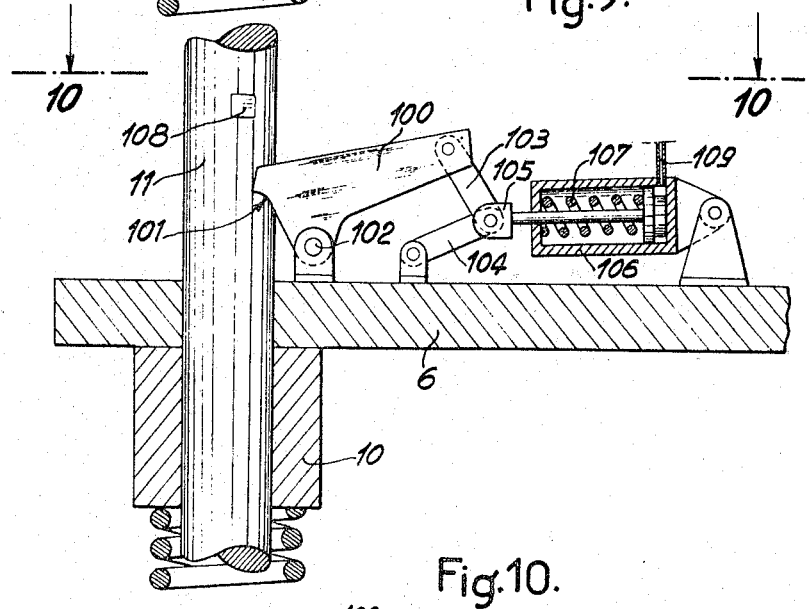
FIGURE 9 is a view similar to FIGURE 8 but showing the device in its release position.
Figure 10:
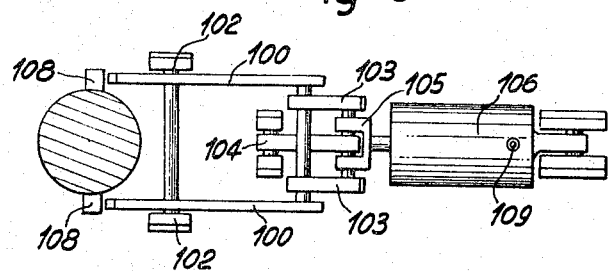
FIGURE 10 is a horizontal section taken upon the line 10—10 of FIGURE 9.

FIGURES 8 and 9 show the two positions assumed by the locking device according as the mold is open or not. The cylinders 106 are supplied with fluid under pressure, for example compressed air, by means of a pipe line 109 connected to the same feed line as the bottle blowing system; thus, when the blowing device is operated the molds are locked in their closed position. As a result, the pressure exerted within the molds is transmitted to the locking device and therefore to the plate 6, so that the follower rollers 12 are relieved from this stress.

Although the specific forms of embodiment shown and described herein refer to a six-mold machine wherein the molds are disposed at spaced intervals on a concentric rotary plate, it is obvious for anybody conversant with the art that this invention is also applicable to a machine comprising a different number of molds as consistent with the desired production rate and the dimensional characteristics of the plate, and also with the operation of the extruder.

Finally, the machine of this invention is also suitable for use in the manufacture of bottles of any desired thermoplastic material, whether organic or inorganic, that is, any material adapted to soften in a reversible manner under the action of heat.

What I claim is:

1. Machine for molding bottles of thermoplastic material by extrusion and blowing, which comprises a support rotatably movable about an axis, means for rotatably driving said support continuously, a plurality of molds mounted on said support at regular intervals about its axis of rotation, each mold comprising a fixed half-mold on said support and a half-mold movable on said support parallel to said axis of rotation, a plurality of arms parallel to said axis of rotation of said support, each arm carrying at one end one of said movable half-molds, roller followers mounted on the opposite ends of said arms, a circular cam member coaxial to said axis of rotation of said support, spring means for resiliently urging said roller followers carried by the ends of said arms against said circular cam, whereby said circular cam controls the opening and closing of said molds during the rotation of said mold support, a fixed flange extending at right angles to the axis of rotation of said support, said fixed flange being disposed behind said circular cam, whereby the roller followers carried by said arms engage said flange when said molds are closed, and a resilient abutment shoe movable in a direction at right angles to the axis of rotation of said support and adapted to urge said roller followers carried by the opposite ends of said arms against said circular cam in a sector of said cam which is adapted to control the closing of said molds by means of a thrust exerted in a direction opposite to the direction of rotation of said support.

2. Machine as set forth in claim 1, wherein said resilient abutment shoe is formed with a face extending at right angles to the axis of rotation of said mold support and co-planar with the face of said flange which is engaged by said roller followers in the mold closing position.

3. Machine as set forth in claim 1, comprising means carried by said mold support for locking each mold in its closed position during the operation of said blowing means.

4. Machine as set forth in claim 3, comprising a compressed-air supply line connected to the blowing means associated with the various molds of the machine, wherein said means for locking each mold in its closed position during the operation of said blowing means comprise a lever fulcrumed on said mold support and a pneumatic cylinder branched off the line delivering compressed air to said mold blowing means.

References Cited

UNITED STATES PATENTS 3,102,304   9/1963   Divers _____ 18—20

FOREIGN PATENTS 1,244,287   9/1960   France.

J. SPENCER OVERHOLSER, *Primary Examiner.*

W. L. McBAY, *Assistant Examiner.*